US008192260B2

(12) United States Patent
Fleming (10) Patent No.: US 8,192,260 B2
(45) Date of Patent: Jun. 5, 2012

(54) METHOD AND SYSTEM FOR A FANTASY SPORTS DRAFT GAME

(75) Inventor: Christopher Scott Fleming, Totowa, NJ (US)

(73) Assignee: Sports Draft Daily, LLC, Totowa, NJ (US)

( * ) Notice: Subject to any disclaimer, the term of this patent is extended or adjusted under 35 U.S.C. 154(b) by 702 days.

(21) Appl. No.: 12/326,258

(22) Filed: Dec. 2, 2008

(65) Prior Publication Data
US 2010/0137057 A1   Jun. 3, 2010

(51) Int. Cl.
*A63F 13/00* (2006.01)
(52) U.S. Cl. ......... 463/1; 463/4; 463/9; 463/10; 463/25; 463/42
(58) Field of Classification Search ........................ None
See application file for complete search history.

(56) References Cited

U.S. PATENT DOCUMENTS

| | | | | |
|---|---|---|---|---|
| 5,018,736 A | * | 5/1991 | Pearson et al. ................. | 463/29 |
| 5,263,723 A | * | 11/1993 | Pearson et al. ................. | 463/41 |
| 6,758,746 B1 | * | 7/2004 | Hunter et al. ................... | 463/9 |
| 7,509,274 B2 | * | 3/2009 | Kam et al. ...................... | 705/35 |
| 7,699,707 B2 | * | 4/2010 | Bahou ............................. | 463/42 |
| 7,762,878 B2 | * | 7/2010 | Nicholas et al. ................. | 463/4 |
| 2004/0110552 A1 | | 6/2004 | Del Prado | |
| 2004/0266530 A1 | | 12/2004 | Bishop | |
| 2006/0252476 A1 | * | 11/2006 | Bahou ............................. | 463/4 |
| 2006/0258421 A1 | * | 11/2006 | Nicholas et al. ................. | 463/4 |
| 2007/0021165 A1 | | 1/2007 | Ma et al. | |
| 2007/0243917 A1 | * | 10/2007 | Wojewoda et al. ............... | 463/9 |
| 2007/0243918 A1 | * | 10/2007 | Wojewoda et al. ............... | 463/9 |
| 2008/0026804 A1 | * | 1/2008 | Baray et al. ..................... | 463/9 |

OTHER PUBLICATIONS

International Search Report and Written Opinion dated Jan. 11, 2010 in corresponding International Patent Application No. PCT/US2009/064936 filed Nov. 18, 2009.

* cited by examiner

*Primary Examiner* — David E Graybill
(74) *Attorney, Agent, or Firm* — Lewis and Roca LLP (57) ABSTRACT

A fantasy sports game provides for a league of fantasy teams, each managed and owned by a fantasy game player. Teams are filled through a player draft of active players followed by ranking each drafted fantasy team utilizing current season player statistics in multiple predefined categories. The rankings in the various categories are totaled to determine team, and thus fantasy game player, rankings. The player statistics utilized are current as of the previous night during regular season play, and as of the end of the season between seasons of play. The draft may be an online web application or utilize live video conferencing.

20 Claims, 3 Drawing Sheets

METHOD AND SYSTEM FOR A FANTASY SPORTS DRAFT GAME

FIELD OF THE INVENTION

The present invention generally relates to online games and, more specifically, to a fantasy sports draft game.

BACKGROUND OF THE INVENTION

It is estimated by the Fantasy Sports Trade Association that 29.9 million people age 12 and above in the U.S. and Canada played fantasy sports in 2007. A prior study by the FSTA showed 19.4 million people age 12 and above in the U.S. and Canada played fantasy sports in 2006 and 34.5 million people had ever played fantasy sports. A 2006 study showed that 22 percent of U.S. adult males 18 to 49 years old, with Internet access, played fantasy sports. Fantasy sports are estimated to have a $3-$4 Billion annual economic impact across the sports industry. Fantasy sports are also popular throughout the world with leagues for football (known as soccer in the United States), cricket and other non-U.S. based sports.

The concept of picking players and running a contest based on their year-to-date stats has been around since shortly after World War II, but was never organized into a widespread hobby or formal business. In 1960, Harvard University sociologist William Gamson started the "Baseball Seminar" where colleagues would form rosters that earned points on the players' final standings in batting average, RBI, ERA and wins. Gamson later brought the idea with him to the University of Michigan where some professors played the game. One professor playing the game was Bob Sklar, who taught an American Studies seminar which included Daniel Okrent, who learned of the game his professor played. At around the same time a league from Glassboro State College also formed a similar baseball league and had its first draft in 1976.

While those two leagues focused on baseball, it may be football that produced the first version of the hobby. The Greater Oakland Professional Pigskin Prognosticators League—began in the early '60s with eight teams and included a cadre of Raiders followers from the media and ticket office—including future league executives Scotty Stirling and Ron Wolf.

The landmark development in fantasy sports may have come with the development of Rotisserie League Baseball in 1980. Magazine writer/editor Daniel Okrent is typically credited with inventing it, the name coming from the New York City restaurant La Rotisserie Francaise where he and some friends used to meet and play. The game's innovation was primarily that "owners" in a Rotisserie league would draft teams from the list of active Major League Baseball players and would follow their statistics during the ongoing season to compile their scores. In other words, rather than using statistics for seasons whose outcomes were already known, the owners would have to make similar predictions about players' playing time, health, and expected performance that real baseball managers must make.

Because Okrent was a member of the media, other journalists, especially sports journalists, were introduced to the game. Many early players were introduced to the game by these sports journalists, especially during the 1981 Major League Baseball strike; with little else to write about, many baseball writers wrote columns about Rotisserie league. A Jul. 8, 1980 New York Times Article titled "What George Steinbrenner is to the American League, Lee Eisenberg is to the Rotisseries League" set off a media storm that led to stories about the league on CBS TV and other publications.

In March 1981, Dan Okrent wrote an essay about the Rotisserie League for Inside Sports called "The Year George Foster Wasn't Worth $36." The article included the rules of the game. Founders of the original Rotisserie league published a guide book starting in 1984. In 1982, Ballantine published the first widely-available Bill James Abstract, which helped fuel fantasy baseball interest. Fantasy fans often used James' statistical tools and analysis as way to improve their teams. James was not a fantasy player and barely acknowledged fantasy baseball in his annual Abstract, but fantasy baseball interest is credited with his strong sales. Soon the hobby spread to other sports as well and by 1988, USA Today estimated that five hundred thousand people were playing.

In the few years after Okrent helped popularize fantasy baseball, a host of experts and business emerged to service the growing hobby. Okrent, based on discussions with colleagues at USA Today, credits Rotisserie League baseball with much of USA Today's early success, since the paper provided much more detailed box scores than most competitors and eventually even created a special paper, Baseball Weekly, that almost exclusively contained statistics and box scores.

Among the first high-profile experts were John Benson, Alex Patton and Ron Shandler. Benson became perhaps the most famous name in the business in the late 1980s, publishing his first book in 1989 and developing one of the first draft-software simulation programs. He had a 900 number at $2.50 per minute (or $150 per hour) in the mid 2000s.

Patton published his first book ("Patton's 1989 Fantasy Baseball League Price Guide") in 1989 and his dollar values were included in USA Today Baseball Weekly's fantasy annual throughout the 1990s.

Ron Shandler published his "Baseball SuperSTATS" book in November 1986. At first the book wasn't meant for fantasy baseball fans, but rather as a book of Sabrmetric analysis.

But it wasn't just baseball that saw new businesses and growth. Fantasy Football Index became the first annual fantasy football guide in 1987. Fantasy Sports Magazine debuted in 1989 as the first regular publication covering more than one fantasy sport. Fantasy Football Weekly was launched in 1992 (later becoming Fanball.com) and had $2 million in revenue by 1999. A large number of companies emerged to calculate the stats for fantasy leagues and primarily sent results to subscribers via fax.

In 1993, USA Today included a weekly columnist on fantasy baseball, John Hunt, and he became perhaps the most visible writer in the industry before the rise of the Internet. Hunt started the first high-profile experts league, the League of Alternate Baseball Reality which first included notables as Peter Gammons, Keith Olbermann, and Bill James. The hobby continued to grow with 1 million to 3 million playing from 1991 to 1994.

But the seminal moment for the growth of fantasy sports was probably the rise of the Internet in the mid-1990s. The new technology lowered the barrier to entry to the hobby as stats could quickly be compiled online and news and information became readily available.

While several fantasy businesses had migrated to the Internet in the mid-1990s, the watershed era for online fantasy sports was arguably in 1997 when two web sites made their debut that forever changed the fantasy sports industry: Commissioner.com and RotoNews.com.

Commissioner.com launched in Jan. 1, 1997 and first offered a fantasy baseball commissioner service that changed the nature of fantasy sports with real-time stats, league message boards, daily updated box scores, and other features—all for $300 per league. Commissioner.com was sold to Sportsline late in 1999 for $31 million in cash and stock in a significant moment for the fantasy industry. The sale proved fantasy sports had grown from a mere hobby to big business. By 2003, Commissioner.com helped Sportsline generate $11 million from fantasy revenue. Commissioner.com is now currently the fantasy sports engine behind CBSsports.com's fantasy area (after Sportsline was sold to CBS).

RotoNews.com also launched in January 1997 and published its first player note on Feb. 16, 1997. RotoNews arguably revolutionized how fantasy sports information was presented on the web with the innovation of the "player notes" which are snippets of information every time a player got hurt, traded, benched or had a news event that impact his fantasy value—all search-able in real-time databases. Many sites today follow how RotoNews had a "news" and "analysis" element to each player update. Within two years, RotoNews had become one of the top ten most trafficked sports sites on the web, according to Media Metrix, ranking higher than such sites as NBA.com. RotoNews.com was sold to Broadband Sports in 1999 and later survived as Roto Wire.com.

It wasn't long before the larger media players got involved. Yahoo.com added fantasy sports in 1999 and offered most of its games for free—a largely new business model for fantasy sports. A trade group for the industry, the Fantasy Sports Trade Association (FSTA), was formed in 1998. Other entries during this era included Fanball.com, launched in 1999 by the parent company of Fantasy Football Weekly.

The first survey of the fantasy sports market in the U.S. in 1999 showed 29.6 million people age 18 and older played fantasy sports games. However, that figure was corrected in later years when it was determined the survey also included people who played NCAA bracket pools, which are not exactly fantasy sports (where individual players are picked).

There were also wide variations on business models. RotoNews.com launched the Web's first free "commissioner" service in 1998, quickly becoming the largest league management service. Yahoo.com became the first major media company to offer games for free in 1999. Due to the rising competition, Commissioner.com, which had charged as much as $300, offered its commissioner services for free starting with football in 2000. Two years later the trend reversed. Sportsline moved back to a pay model for commissioner services (which it largely still has today). TheHuddle.com, a free site since 1997, started to charge for information. RotoWire.com moved from a free model to a pay model in 2001 as well.

Despite the economic instability, fantasy sports started to become a mainstream hobby. In 2002, the NFL found that the average male surveyed b spent 6.6 hours a week watching the NFL on TV, but that fantasy sports players surveyed said they watched 8.4 hours of NFL per week. The NFL began running promotional television ads for fantasy football featuring current players for the first time. Previously, fantasy sports had largely been seen in a negative light by the major sports leagues.

Fantasy sports continued to grow with a 2003 FSTA survey showing 15 million people playing fantasy football and spending about $150 a year on average, making it a $1.5 billion industry. With the growth of the industry, fantasy has branched out to include non-sports related games focused on politics, celebrity gossip, movies, and reality TV. Notable games in these new categories include:

Fantasy Congress

Fantasy Mogul

As noted above, Fantasy baseball is one of the most popular fantasy sports. The following describes some variations of fantasy baseball in more depth. Note though that this is illustrative only. There are other methods of play and other fantasy sports.

Fantasy baseball is a game whereby fantasy game players manage imaginary baseball teams based on the real-life performance of baseball players, and compete against one another using those players' statistics to score points. It is probably the oldest form of fantasy sports, and arguably one of the most difficult and time-intensive due to the 162-game season of the MLB and the inconsistency of players.

Rotisserie Leagues and their descendants typically draft teams before the season begins (or very shortly thereafter). One approach is to hold an auction, whereby each owner or manager has a fixed amount of money to bid for players, and he must fill his team's roster within his budget. Another approach is to perform a serpentine system draft of available players until all teams are filled.

In either case, the skills of the fantasy team managers come into play in the "preseason" by their knowledge of the talent and ability to forecast the performance of Major League Baseball players and prospects for the coming season. Toward that end, they draw on a great variety of sources of information, including tout sheets by various forecasters, who predict the coming season's performance and the likely overall "value" (often in terms of auction dollars) of the Major League players.

Some leagues allow teams to keep some players from one year to the next, allowing savvy owners to build fantasy dynasties. These leagues are often referred to as "Keeper Leagues." Keeper leagues typically have the same people in them, and owners keep their players, unless any off-season moves are made.

Many leagues allow teams to trade with each other during the season, as well as to replace players who get hurt or stop performing well with players from the pool of those who are not presently owned. However, some leagues prohibit such in-season "free agent" replacements, likely feeling that the game is more interesting when teams must live and die by the quality of their draft.

Also, at a league's discretion, there are typically only a limited number of free-agent moves that a fantasy team can make per season, and a team may not just "drop" all of their players if they are not progressing well during a season. The free-agent limit is also sometimes used to limit the so-called "pitch-and-ditch" tactic, a method of play in which a manager drafts a free agent pitcher with the intention of using him in only one game before replacing him with a pitcher who is scheduled to start the following day.

Many fantasy leagues are played for money. "Owners" ante up an entry fee at the beginning of the season and may also be charged for in-season activity such as trades and "free agent" acquisitions. The pool of money is collected and then distributed to the winner(s) at the end of the season. In some cases though, these are games in which the main reward is bragging rights or the participants' sense that they not only know how to assess baseball talent but also how to play the fantasy game in all of its dimensions including perhaps above all the selection of real baseball talent.

The statistics compiled by the players from each team are then ranked by category, and the team with the highest cumulative rank at the end of the season is determined to be the winner.

The original Rotisserie League used the following statistics:

team batting average (total hits divided by total at-bats)

total home runs total runs batted in total stolen bases
total wins
total saves
team earned run average (9 times total earned runs divided by total innings pitched, the lower the better)
team WHIP (total number of hits and walks allowed by pitchers divided by total innings pitched, the lower the better)

This is often called a "4×4" league (4 hitting stats and 4 pitching stats). Many leagues have adopted a "5×5" format, with runs and strikeouts (as a pitching statistic) added, respectively. Still other leagues have adopted a "6×6" format, most commonly adding OPS (OBP plus SLG), and holds. However, the "6×6" format does not yet have a standard or consensus set of categories to use. Other modifications to the rules include a minimum number of at-bats and innings pitched; teams that do not make the minimum were awarded last place in the respective categories.

An alternative head-to-head system provides that each team competes against only one team each week. At the end of the week, each team tallies wins and losses based on whatever criteria are set by the league. Below are three exemplary basic forms of head-to-head leagues (often referred to as "H2H"):

Head-to-Head Rotisserie: Wins, losses and ties are based on a team's performance in individual categories.

Head-to-Head One Win: Just like H2H Rotisserie, but the winner receives just one win, rather than one win for each category the team wins.

Head-to-Head Points: Stats accumulate points for each team (a Home Run/Stolen Base/etc. is worth a certain number of points), and the team with the most points at the end of the week is awarded a win. These leagues often take advantage of several other statistical categories, from outfield assists to quality starts.

Opponents are often dictated by a round-robin system. At the end of the season, the team with the best win-loss record is the victor. Many head-to-head leagues also feature playoffs over the last 3-4 weeks of the MLB regular season. A set number of teams make the "postseason" and play a single-elimination tournament to decide a victor.

While there is still a lot of enthusiasm for the present methods of fantasy sports gaming, a better, more challenging method of fantasy gaming would be advantageous.

BRIEF SUMMARY OF THE INVENTION

A fantasy sports game provides for a league, competition, or tournament of fantasy teams, each managed and owned by a fantasy game player. Teams are filled through a player draft of active players followed by ranking each drafted fantasy team utilizing current season player statistics in multiple predefined categories. The rankings in the various categories are totaled to determine team, and thus fantasy game player, rankings. The player statistics utilized are current as of the previous night during regular season play, and as of the end of the season between seasons of play. The draft may be an online web application, utilize live video conferencing or conducted live in person.

DETAILED DESCRIPTION OF THE INVENTION

The present invention conducts fantasy sports drafts for baseball, football, basketball, hockey, soccer, NASCAR, golf, and other sports by using the current seasons stats for each athlete, but rather than count what they do in future games, the outcomes of each draft contest are based on using retro-active, cumulative statistics for the current season or historical statistics for past seasons. The present invention includes drafting professional players as well as amateurs, such as college competitors. Current fantasy sports leagues are typically conducted by holding either live or online drafts where a fantasy game player acting as an owner/manager picks players based on projected stats and then manages those players throughout the regular season to accumulate the stats that they derive in real life. Henceforth, the terms "owner", "manager" and "fantasy game player" will be used interchangeably. One key difference in the present invention is that the stats are applied retroactively; making it so that what the players do in the future games is essentially meaningless in contests in the present invention.

Applicants believe that what draws people the most to these games is the initial player "draft". The actual managing of the fantasy teams post-draft is often cumbersome and based on some degree of luck in determining winners over losers. In one embodiment of this invention, the game provides for fantasy game players arriving at a website online and conducting a normal draft, just like the ones they are accustomed to in the prior art, but instead of drafting based on projections of future performance of their drafted players, they will be drafting utilizing "known stats" for each player. There could for example be a draft order randomly selected by a computer for each participant, numbered 1-12. The draft could then be conducted in a serpentine fashion, 1-12, 12-1, 1-12, etc. Other selection and draft methodologies are also within the scope of the present invention, including randomizing each round of the draft.

In one embodiment of the present invention, there are roster requirements that each team will have to fulfill for each game. These roster requirements may vary from game to game, depending on the embodiment. As a further example: in baseball the hitters would be: 2 Catchers, 1 First Baseman, 1 Second Baseman, 1 Third Baseman, 1 Shortstop, 5 Outfielders, 1 Utility Player, 1 Middle Infielder (2B/SS), 1 Corner Infielder (1B/3B). On the pitching side there would be 9 slots that could be made up of starting and relief pitchers to the players choosing, allowing for varying strategies. The positions may be drafted in any order, but each slot would have to be filled after 23 rounds of drafting to have a legal roster. Other team organizations would also be within the scope of the present invention. In one embodiment, the statistical categories that would be used for scoring the fantasy game are: batting average; home runs; runs batted in; runs scored; and stolen bases for the hitters, and wins; strikeouts; saves; earned run average; and walks+hits per inning pitched for the pitchers. Collectively there would be 10 categories that a player can earn points in and each are weighted equally in this embodiment. For example, in this embodiment: the team that accumulates the most home runs from their 14 hitters would be awarded 12 points for that category. The team with the second most homeruns would receive 11 points, down to the team with the fewest homeruns receiving 1 point. This would be applied for each individual category. The "total points"

each fantasy team attains in "each category" would then be added together to arrive at their "total score." In one embodiment, there would be 12 teams in each game, thus making the maximum point accumulation for each team 120 points.

In one embodiment, one goal of the game would be to draft a team and accumulate the most points overall versus the other 11 teams. After all 12 teams have selected the 23 required players, a winner would be determined, as well as, a ranking of the 12 fantasy teams in order of point accumulation. Due to the structure of the present invention, in a preferred embodiment, the stats are already set in stone for each major league baseball player, so each player in the fantasy game will be working with the same set of numbers. It would typically be their job to figure out a way of beating the other 11 players at accumulating the most points. Each individual retro draft would typically have different results because of the varying ways each player would take to fill out their roster, as well as the changing statistics as a season of play progresses. It is somewhat like a chess match, since the contests are highly skill based. One advantage, compared to the prior art, is that a winner is determined at the conclusion of each retro draft. So instead of drafting players in March and managing them over the course of the next six months to determine a winner; the unknowns, such as player injuries, free agent bidding, and unfair trades (the luck aspects in the prior art) are removed and replaced with instant gratification based on the skill level of the drafters. Another advantage is that people can play this game everyday, or even multiple times per day, year round. Draft Day, the favorite part of many fantasy sports competitors, is now available perpetually.

The games offered in the present invention are future based, while the statistics used to determine winning and losing are retroactive. While the games in the present invention will typically focus on the current season in each sport, it will typically be contests based on what has happened up until that point in time. So, if a player entered this game for baseball on Jul. 7, 2008, they would typically be drafting players based on their cumulative statistics from opening day 2008 up to and including Jul. 6, 2008. When the real games for July 7 conclude, the stats will be updated overnight to reflect those results, so that on July 8 the games in the present invention will be played using the cumulative stats from opening day 2008 up to and including July 7. In an alternative embodiment, the statistics would be updated in real time. This will continue through each sport's "regular season" and then people can play the contests based on the entire season up to the next year's season starting date. At that time the prior season can still be played, but the day-to-day updates of the new season will also be running. Similarly, the games can be played utilizing historical statistics from previous years and seasons. Again, some of the important elements are the following: fantasy sports contests based on cumulative retroactive stats of current and past seasons; the ability to conduct fantasy sports drafts in baseball, football, hockey, basketball, etc. 24 hours per day 365 days a year (other sports such as NASCAR, Soccer, and Golf are also within the present invention); immediate gratification—winners can typically be determined upon the completion of each draft; and winning will be skill based—the ability to draft players and their corresponding stats better than their opponents.

Figure 1:
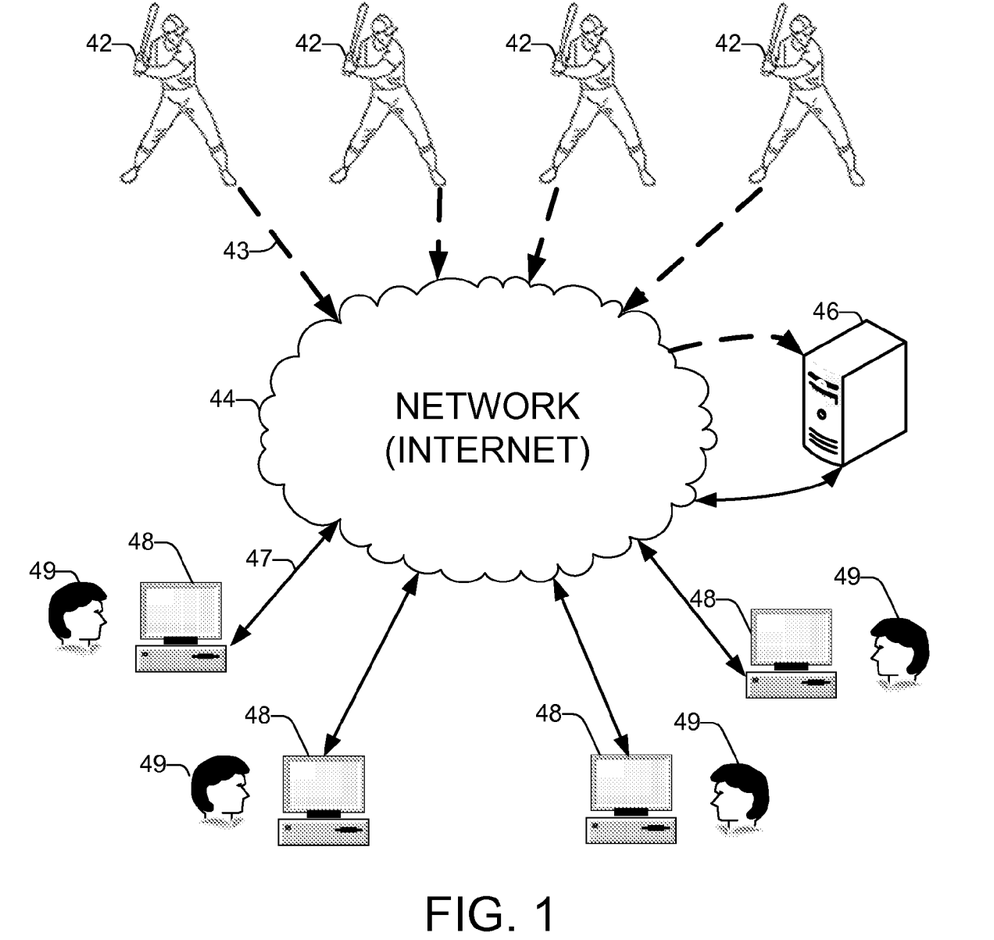
FIG. 1 is a block diagram illustrating an exemplary system, in accordance with one embodiment of the present invention.

FIG. 1 is a block diagram illustrating an exemplary system, in accordance with one embodiment of the present invention. This embodiment utilizes baseball as the fantasy sport, but other sports are also within the scope of this invention. Multiple baseball games 42 are played, and their statistics transmitted to 43 and accumulated on a server 46. In this embodiment, the entire play of Major League Baseball (MLB) or one of its two leagues is utilized for these statistics. Alternatively, the statistics can be accumulated by other parties and acquired from them. In this illustration, the transmission is shown across a network, in this example, the Internet 44. Fantasy game players (the fantasy team managers) 49, in this example utilizing their computers 48, join a fantasy league run on the server 46. In this embodiment, they will typically utilize actual sport statistics, up to that date, to pick their fantasy teams, communicating again across the network with the server 46. Alternatively, they may utilize conferencing, and in particular, on-line conferencing, to make their draft picks. At the end of the draft, software on the server 46 is utilized to rank the fantasy teams in the fantasy league, utilizing pre-established criteria, as noted above. In one embodiment of the present invention, the fantasy player interface is web based, utilizing web browsers running on their computers 48 to communicate 47 across the Internet 44 with the fantasy game running as a web server application on the server 46. Other interfaces and system architectures are also within the scope of the present invention.

Figure 2:
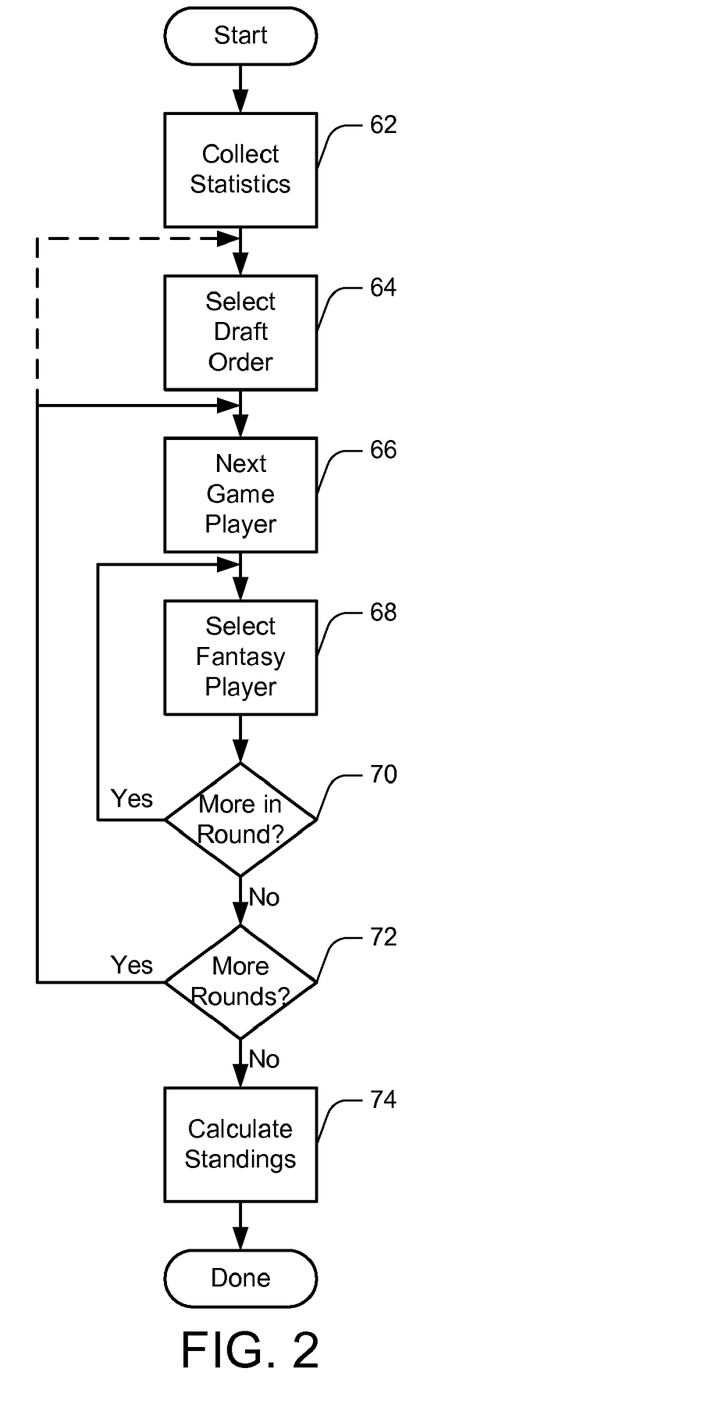
FIG. 2 is a flow chart illustrating an example of the game play in accordance with one embodiment of the present invention.

FIG. 2 is a flow chart illustrating an example of the game play in accordance with one embodiment of the present invention. Actual player statistics are collected over time, step 62, preferably over the current season, or last season if between seasons. In a preferred embodiment, the actual play statistics are current as of the end of the last game the night before. A draft order is selected, step 64, indicating how the fantasy managers are going to draft their players. For example, if there are 12 fantasy teams in a fantasy league, the 12 fantasy managers may draw numbers 1 through 12. Then a serpentine draft could be utilized to draft allow drafting in the order 1-12, 12-1, 1-12, etc. The next fantasy manager to draft is selected, step 66, by this process, and he selects his next real player, step 68. This selection will then typically be relayed to the other fantasy managers to indicate that this real player is no longer draftable. A test is then made whether this is the end of a round of drafting, step 70. If there are more fantasy managers to draft in this round, step 70, the process repeats as a loop, with the next real player being selected, step 68. If not, then a test is made whether there are more rounds to the draft, step 72. If each fantasy team is to have 23 players, there will typically be 23 rounds to the draft. If there are still more rounds in the draft to complete, step 72, the method repeats, with the selection of the next fantasy manager to draft players, step 66. Thus, if this is the end of the first round of a serpentine draft, manager #12, having drafted last in round one, will draft first in round two. Then, when the rounds of drafting are complete, and there are no more rounds of drafting, step 72, each team is preferably checked to make sure it is legal, the standings of the fantasy teams in the fantasy league are calculated based on the latest statistics for the year, the standings or rankings are provided to the fantasy managers, and the play is complete.

There are other methods and techniques available and within the scope of the present invention for determining the order in which fantasy managers draft their players. For example, the drafting order of each round could be randomly determined, as shown by the dashed line in FIG. 1 wherein the decision whether there are more rounds, step 72, repeats to the selection of the draft order, step 64, instead of the next step of selecting the next fantasy manager to draft, step 66. Another alternative is for the entire draft order be randomly determined. So, if there are 12 teams of 23 players each, there are 276 total players to be drafted. The numbers 1 through 276 could be randomly ordered utilizing well know computer techniques. Then, one fantasy coach might take numbers 1-23, the second 24-46, etc. With a similar result, he might take numbers 1, 24, 47, etc., and the second manager take numbers 2, 25, 48, etc. In one embodiment of the present invention, the draft order is relayed to the fantasy coaches prior to the start of the draft so that they know the order that they will be drafting. In another embodiment, the draft order is at least partially hidden from the fantasy managers, so that there is more excitement and uncertainty. In another embodiment, fantasy team owners/managers bid, preferably online, for players, among each other, with each team owner/manager having a fixed salary cap for all their players. Other methods and techniques for determining the order and/or method that fantasy managers and/or coaches draft their players are also within the scope of this invention. In another embodiment, in order to make the games even more skill based, players can be given a grouping of historical events pertaining to sports. They would then be required to list those events in order from earliest to most recent while being timed doing so. The players will be ranked based on the most correct answers, with the fastest times breaking ties. This will result in providing an order in which the players can then choose their preferred draft slot in that given competition, league, or tournament.

In one embodiment of the present invention, players are given a time limit for selecting their players. This may be fairly short, such as 30 seconds for each pick, or may be longer. Also, the entire time that a player can take making his draft picks may be specified, as opposed to providing him a fixed amount of time for each pick. This is similar to how timing works in speed chess, where when one player completes a pick, his clock stops and the clock for the next player drafting starts.

Figure 3:
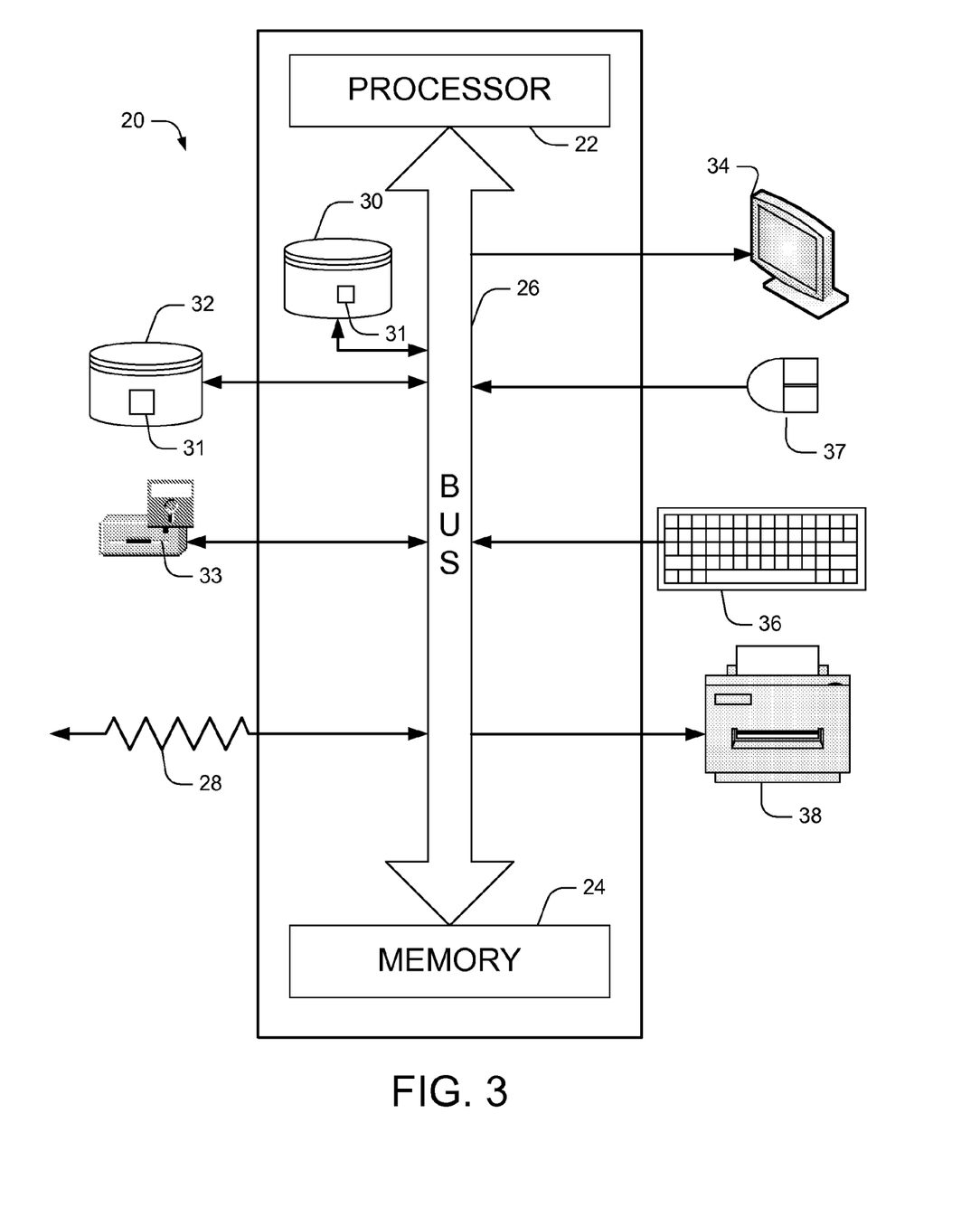
FIG. 3 is a block diagram illustrating a General Purpose Computer 20, such as utilized for the server and personal computers shown in FIG. 1.

FIG. 3 is a block diagram illustrating a General Purpose Computer 20, such as utilized for the server 46 and personal computers 48 shown in FIG. 1. The General Purpose Computer 20 has a Computer Processor 22 (CPU), and Memory 24, connected by a Bus 26. Memory 24 is a relatively high speed machine readable medium and includes Volatile Memories such as DRAM, and SRAM, and Non-Volatile Memories such as, ROM, FLASH, EPROM, EEPROM, and bubble memory. Also connected to the Bus are Secondary Storage 30, External Storage 32, output devices such as a monitor 34, input devices such as a keyboard 36 with a mouse 37, and printers 38. Secondary Storage 30 includes machine-readable media such as hard disk drives, magnetic drum, and bubble memory. External Storage 32 includes machine-readable media such as floppy disks, removable hard drives, magnetic tape, CD-ROM, and even other computers, possibly connected via a communications line 28. The distinction drawn here between Secondary Storage 30 and External Storage 32 is primarily for convenience in describing the invention. As such, it should be appreciated that there is substantial functional overlap between these elements. Computer software such operating systems, utilities, user programs, and fantasy game and statistics collection software can be stored in a Computer Software Storage Medium, such as memory 24, Secondary Storage 30, and External Storage 32. Executable versions of computer software 33, such as defragmentation software and operating systems can be read from a Non-Volatile Storage Medium such as External Storage 32, Secondary Storage 30, and Non-Volatile Memory and loaded for execution directly into Volatile Memory, executed directly out of Non-Volatile Memory, or stored on the Secondary Storage 30 prior to loading into Volatile Memory for execution.

In one embodiment of the present invention, games are provided on a web site. The Web site offers a plurality of different types of games including head to head or multiple team competitions with varying roster requirements and/or number of rounds of drafting, and of memberships. For example, one type of membership could be a free limited membership. Another type of membership could require a monthly fee. A third type of membership would require competition or a fee to join. Another alternative would be hosted leagues, competitions, or tournaments where players meet either online or in real space to form a league, competition, or tournament hosted by this service, and providing the benefits of this invention. In one embodiment, the players in such a hosted league, competition, or tournament would pay for the hosting of games. In another, the hosting would be paid for by advertising. Other types and methods of organizing are also within the scope of the present invention.

In further detail for this embodiment, there are at least three different types of tournaments or competition available. One of these is a Basic Membership competition, where participants sign up, create usernames, and are able to play in NFL, MLB, NBA, NHL, etc. draft competitions and/or tournaments with prizes awarded in pre established "Cash" amounts or "Play Points" or "Entry Seats" into future larger tournaments. In one embodiment, there are no costs to be a Basic Member. Rather, that level of membership is supported by advertising within the game and no live chat customer support is provided.

A second type of tournament or competition is a Sports Club Membership. Participants typically have the same options as the Basic Members, but within this membership they have access to many more daily competitions and/or tournaments with chances to win actual cash prizes, Play Points, or Entry Seats to future tournaments. In one embodiment, there is no in-game advertising and there is live chat customer support for this membership. It also offers weekly, quarterly, and an annual tournament schedule to win larger cash prizes.

In both the Basic and Sports Club Memberships, the fee of entry for games is typically "Play Points." For example, each new player might receive 100 Play Points upon registering and these points would be used to enter the daily competitions and/or tournaments. One object might be to accumulate enough Play Points to allow the players the ability to enter the larger tournaments in an effort to win the larger cash prizes. In one embodiment, the Play Points never have a cash value, and if a player runs out of points or has below a minimum number of points (e.g. 100) on any given day, his points are reset at to that level (100) for the next calendar day. In one embodiment, separate leader boards and results are kept for each sport and in the annual tournament each player typically participates in four sports (NFL, MLB, NBA, NHL) to determine an overall champion. In this embodiment, the competitions and/or tournaments in the membership sections are typically either head-to-head (speed), 10 team, or 12 team competitions with a set number of rounds. Other configurations are also within the scope of this invention.

A third type of competitions are Sit and Go Cash Competitions. In both the Basic and Sports Club memberships described above, the players use Play Points to enter "administrative generated" competitions/tournaments. One difference in the Sit and Go Cash Competitions is that the players have the ability to create and/or join their competitions of choice. They can choose the number of teams, number of rounds, time limit per pick, which sport, the dollar amount entry fee, the date, the time, the pay-out structure (winner take all or top three), etc. These competitions typically have entry fees of cash (or equivalent), not Play Points, and the winners are paid out a fixed percentage (for example, 80%) of all entry fees collected for any given competition. The remainder (in this example, 20%) is revenue from this model as a management fee for hosting the competitions. In one embodiment, players do not have to be Sports Club Members to have access to this section of competitions. Other financial arrangements are also within the scope of the present invention, such as providing fixed prize or prizes, instead of a percentage of all entry fees.

There are typically two primary types of Sit and Go Cash competitions: player created; and administratively created. In one embodiment of the Sit and Go Cash Competitions, the individual players have the ability to set the number of entrants they wish to play with from a drop down menu when they create a competition. Each competition typically has a minimum of 2 players, though in some embodiments, one or more of those players may be virtual computer based players. Typically, "user" created competitions are determined by the creator of each competition and when the maximum number of players have joined, the total cash prize pool will be set for that competition. A percentage of those entry fees is typically charged for hosting and managing the competition. Any "administrator" generated competitions typically specify in advance the date, time, number of teems, entry amount, sport, etc. to potential players. These have specific details and therefore a set prize pool for each of these types of competitions. Other configurations are also within the scope of the present invention.

Some examples of Sit and Go competitions are the following:
The options available for each competition are:
date
time
sport (MLB, NFL, NBA, NHL, NASCAR, etc.)
# of teams
# of rounds
entry fee
A registered user is allowed to create a competition from the list above and once it fills the total sum of all entry fees will be the pot for that competition (minus any management fee %).
Administratively created competitions similarly can be scheduled, typically providing a variety of competitions from the options above, allowing players to join the competitions they want to play in.

In another embodiment, competitions and tournaments are also run from an online website in a live-in-person format. A website could provide web based or live-in-person competitions and/or tournaments, or both.

Those skilled in the art will recognize that modifications and variations can be made without departing from the spirit of the invention. Therefore, it is intended that this invention encompass all such variations and modifications as fall within the scope of the appended claims.

What is claimed is:

1. A method of fantasy gaming comprising:
   drafting players for a fantasy league comprising a plurality of fantasy teams with each fantasy team comprising a plurality of players;
   collecting current retroactive statistics for a sport as of the date of the drafting;
   calculating rankings in a plurality of categories for the plurality of players in the plurality of fantasy teams utilizing the current retroactive statistics as of the date of the drafting of the players; and
   calculating an overall rankings of each of the plurality of fantasy teams as of the date of the drafting of the players based on the rankings of the plurality of fantasy teams in the plurality of categories.

2. The method in claim 1 wherein:
the drafting comprises a serpentine draft.

3. The method in claim 1 wherein:
the drafting comprises generating an entire list of draft pick numbers in a random order and assigning those draft pick numbers to each of the plurality of fantasy teams.

4. The method in claim 1 wherein:
the drafting utilizes online conferencing among fantasy game players.

5. The method in claim 1 wherein:
the drafting utilizes bidding by fantasy game players for players for their fantasy teams and each of the plurality of fantasy teams has a fixed budget for players.

6. The method in claim 1 which further comprises:
accepting payment from players of the fantasy game in order to play.

7. The method in claim 1 which further comprises:
paying a monetary prize to a player of the fantasy game.

8. The method in claim 1 which further comprises:
providing advertising to players of the fantasy game.

9. The method in claim 1 wherein:
the calculating of rankings of the plurality of fantasy teams in the plurality of categories ranks the plurality of fantasy teams in each of the plurality of categories and awards a fixed number of points for each place in each of the plurality of categories; and
the calculating the overall rankings of the fantasy teams sums the points awarded each of the plurality of fantasy teams in each of the plurality of categories and ranks the plurality of fantasy teams based on the sum of points for that fantasy team.

10. The method in claim 1 which further comprises:
verifying that each of the plurality of fantasy teams has a roster where each of a plurality of positions has been filled with a required number of players by an end of the drafting.

11. A system for providing fantasy sports gaming comprising:
   a processor; and
   a memory containing instructions executable by the processor for:
      drafting players for a fantasy league comprising a plurality of fantasy teams with each fantasy team comprising a plurality of players;
      collecting current retroactive statistics for a sport as of the date of the drafting;
      calculating rankings in a plurality of categories for the plurality of players in the plurality of fantasy teams utilizing the current retroactive statistics as of the date of the drafting of the players; and
      calculating an overall ranking of each of the plurality of fantasy teams as of the date of the drafting of the players based on the rankings of the plurality of fantasy teams in the plurality of categories.

12. The system in claim 11 wherein:
the drafting comprises a serpentine draft.

13. The system in claim 11 wherein:
the drafting comprises generating an entire list of draft pick numbers in a random order and assigning those draft pick numbers to each of the plurality of fantasy teams.

14. The system in claim 11 wherein:
the drafting utilizes online conferencing among fantasy game players.

15. The system in claim 11 wherein:
the drafting utilizes bidding by fantasy game players for players for their fantasy teams and each of the plurality of fantasy teams has a fixed budget for players.

16. The system in claim 11 wherein the computer instructions further provide for:
  accepting payment from players of the fantasy game in order to play.

17. The system in claim 1 wherein:
  the calculating of rankings of the plurality of fantasy teams in the plurality of categories ranks the plurality of fantasy teams in each of the plurality of categories and awards a fixed number of points for each place in each of the plurality of categories; and
  the calculating the overall rankings of the fantasy teams sums the points awarded each of the plurality of fantasy teams in each of the plurality of categories and ranks the plurality of fantasy teams based on the sum of points for that fantasy team.

18. The system in claim 11 wherein the computer instructions further provide for:
  verifying that each of the plurality of fantasy teams has a roster where each of a plurality of positions has been filled with a required number of players by an end of the drafting.

19. The system in claim 11 which further comprises:
  a means for communicating with the Internet.

20. A computer readable medium containing computer instructions executable by a processor for providing fantasy sports gaming, said computer instructions for:
  drafting players for a fantasy league comprising a plurality of fantasy teams with each fantasy team comprising a plurality of players;
  collecting current retroactive statistics for a sport as of the date of the drafting;
  calculating rankings in a plurality of categories for the plurality of players in the plurality of fantasy teams utilizing the current retroactive statistics as of the date of the drafting of the players; and
  calculating an overall ranking of each of the plurality of fantasy teams as of the date of the drafting of the players based on the rankings of the plurality of fantasy teams in the plurality of categories.

* * * * *